United States Patent [19]

Hagelbarger

[11] 4,007,459
[45] Feb. 8, 1977

[54] MULTITONE PUSHBUTTON DIAL PHASE SHIFT SCANNING CIRCUITRY

[75] Inventor: David William Hagelbarger, Morristown, N.J.

[73] Assignee: Bell Telephone Laboratories, Incorporated, Murray Hill, N.J.

[22] Filed: July 10, 1975

[21] Appl. No.: 594,819

[52] U.S. Cl. .................. 340/365 S; 340/365 C; 179/90 K; 328/14
[51] Int. Cl.² .......................................... G08C 1/00
[58] Field of Search ................... 340/365 S, 365 C; 178/17 C; 328/14; 179/90 K

[56] References Cited
UNITED STATES PATENTS

| | | | |
|---|---|---|---|
| 3,293,450 | 12/1966 | Chalfin | 340/365 C |
| 3,483,553 | 12/1969 | Blankenbaker | 340/365 C |
| 3,721,976 | 3/1973 | Kuijsten | 340/365 C |
| 3,820,028 | 6/1974 | Thomas | 328/14 |
| 3,904,887 | 9/1975 | Hagelbarger | 340/365 C |

Primary Examiner—Charles D. Miller
Attorney, Agent, or Firm—Charles Scott Phelan; A. E. Hirsch, Jr.

[57] ABSTRACT

In a multitone pushbutton dial array each switch in the array has a variable impedance coupling between a fixedly mounted conductive plate and a movable conductive plate spaced apart from the fixedly mounted plate. Digitally synthesized signals having a predetermined phase and frequency are sequentially and recurrently used to scan interconnected columns of movable plates in the pushbutton dial array. Signals having an opposite phase from the scanning signals are continuously applied to the fixedly mounted plates. When a pushbutton is depressed variable impedance coupled summation signals are produced and these signals have a phase which is opposite to that of signals coupled to the detector from an unoperated switch. The detected digital signals are used to generate digital multitone row and column frequency signals. These digital row and column signals are converted to analog form and are transmitted to a telephone central office as a dialed digit code.

25 Claims, 12 Drawing Figures

FIG. 1

|  | 1209 | 1336 | 1477 |  |
|---|---|---|---|---|
| 697 | 1 | ABC 2 | DEF 3 | R1 |
| 770 | GHI 4 | JKL 5 | MNO 6 | R2 |
| 852 | PRS 7 | TUV 8 | WXY 9 | R3 |
| 941 | * | OPERATOR 0 | # | R4 |
|  | C1 | C2 | C3 |  |

FIG. 2

TABLE OF RELATIVE TIME SUB-INTERVALS FOR TWO CYCLES OF THE DIGITAL MULTITONE WAVEFORMS

|  |  | R1 | R2 | R3 | R4 | C1 | C2 | C3 |
|---|---|---|---|---|---|---|---|---|
| FREQUENCY, Hz | | 697 | 770 | 852 | 941 | 1209 | 1336 | 1477 |
| FREQ. DIV. COEFFICIENT | | 182 | 165 | 149 | 135 | 105 | 95 | 86 |
| NO. PULSES TO ADJUST | | 15X12 (+2) | 14X12 (-3) | 12X12 (+5) | 11X12 (+3) | 9X12 (-3) | 8X12 (-1) | 7X12 (+2) |
| SUB-INTERVAL NUMBER | 1 | 15T | 14T | 13T | 11T | 9T | 8T | 7T |
| | 2 | 15T | 14T | 12T | 11T | 9T | 8T | 7T |
| | 3 | 16T | 13T | 13T | 12T | 8T | 8T | 8T |
| | 4 | 15T | 14T | 12T | 11T | 9T | 8T | 7T |
| | 5 | 15T | 14T | 12T | 11T | 9T | 8T | 7T |
| | 6 | 15T | 13T | 13T | 12T | 8T | 7T | 7T |
| | 7 | 15T | 14T | 12T | 11T | 9T | 8T | 7T |
| | 8 | 15T | 14T | 12T | 11T | 9T | 8T | 7T |
| | 9 | 16T | 13T | 13T | 12T | 8T | 8T | 8T |
| | 10 | 15T | 14T | 12T | 11T | 9T | 8T | 7T |
| | 11 | 15T | 14T | 12T | 11T | 9T | 8T | 7T |
| | 12 | 15T | 14T | 13T | 11T | 9T | 8T | 7T |

$T = 1/63.476$ kHz

FIG. 8
(TRUTH TABLE)

| TIME SUB-INTERVALS | A | B | C | D | E |
|---|---|---|---|---|---|
| 1 | 1 | 1 | 0 | 0 | 0 |
| 2 | 0 | 1 | 1 | 0 | 0 |
| 3 | 0 | 0 | 1 | 1 | 0 |
| 4 | 0 | 0 | 0 | 1 | 0 |
| 5 | 0 | 0 | 0 | 0 | 0 |
| 6 | 1 | 0 | 0 | 0 | 0 |
| 7 | 1 | 1 | 0 | 0 | 1 |
| 8 | 0 | 1 | 1 | 0 | 1 |
| 9 | 0 | 0 | 1 | 1 | 1 |
| 10 | 0 | 0 | 0 | 1 | 1 |
| 11 | 0 | 0 | 0 | 0 | 1 |
| 12 | 1 | 0 | 0 | 0 | 1 |

FIG. 9

| FIG.6a | FIG.6c |
|---|---|
| FIG.6b | FIG.6d |

MULTITONE PUSHBUTTON DIAL PHASE SHIFT SCANNING CIRCUITRY

BACKGROUND OF THE INVENTION

1. Field of the Invention

This invention relates to multitone pushbutton dial arrays and, in particular, to phase reversal scanning circuitry for detecting the operation of a pushbutton switch in the dial array.

2. Description of the Prior Art

Multitone pushbutton dials have been used in telephone station sets for several years. One such dial utilizes a crossbar type switch arrangement and inductor-capacitor oscillator circuitry for generating the multitone signals. This type of dial is mechanically complicated and, therefore, tends to become relatively unreliable after repeated usage. Moreover, this type of dial is somewhat bulky and expensive since the inductors must meet relatively stringent tolerances.

Another type of dial utilizes resistive-capacitive thin film osillator circuitry in conjunction with operational amplifiers and resistive contact switches. This type of dial suffers the disadvantages of requiring expensive, precision circuit components and, because of the use of operational amplifiers, tends to consume somewhat more power than the crossbar type dial.

The use of precision circuit elements for the generation of the multitone signals can be advantageously circumvented by digitally synthesizing the multitones in accordance with a technique disclosed in U.S. Pat. No. 3,787,836, issued to D. W. Hagelbarger on Jan. 22, 1974. However, the replacement of the precision analog oscillator circuitry with digital circuitry tends to make power consumption dependent to some extent on the circuit operating speed.

The problems inherent in resistive contact type switches can be advantageously overcome by the use of capacitively coupled pushbutton switches of a type disclosed in my U.S. Pat. No. 3,904,887, issued Sept. 9, 1975 entitled "Snap-Action Pushbutton Switch" and assigned to Bell Telephone Laboratories, Incorporated. Unfortunately, the replacement of the resistive switches with capacitively coupled switches gives rise to a further problem, namely, the detection of when a given switch in the array of pushbuttons has been operated.

This detection problem can be overcome by the use of some form of scanning. Scanning techniques are well known in the prior art but the application of these techniques to capacitively coupled switches is a somewhat recent development. For example, the scanning of capacitive switches in a keyboard matrix is disclosed in a published patent application No. B289,523 of J. W. Volpe, published Jan. 28, 1975. However, Volpe's scanning technique requires the use of a relatively high frequency carrier signal on the order of 1 megahertz superimposed on a binary selection signal to interrogate each key. Of necessity, this approach requires a separate carrier signal source along with demodulation circuitry to remove the high frequency burst and shaping circuitry to form a square pulse. This circuitry is required in order to detect the change in capacitance produced by a key closure. While this method of scanning capacitive switches is satisfactory for keyboards used in computer terminal equipment, typewriters and the like, where power consumption is not a major consideration, it is not readily adaptable for use in a telephone dial where power consumption is of major importance. The importance of minimizing power consumption in a telephone dial application becomes clear when one appreciates that many such dials must be powered from a single central office and that these dials may be at locations which are many miles from the central office.

Accordingly, it is one object of the present invention to implement a technique for scanning an array of capacitive switches wherein power consumption is held to relatively low levels on the order of a few milliwatts or less.

Another object is to utilize relatively low frequency logic signals to scan the dial array, the frequency of the scanning signals being on the order of 100 kilohertz or less.

Still another object of the present invention is to simplify the overall complexity of the scan detection circuitry.

A further object is to configure a telephone dial utilizing the aforementioned scanning technique so that a number of such dials may be powered directly from a single power source located at a distant central office.

SUMMARY OF THE INVENTION

The foregoing and other objects of the invention are realized in an illustrative embodiment comprised of an arrangement for identifying an actuated switch in a matrix array of such switches wherein plural intersecting row and column circuits have a different one of the switches coupled between the intersecting row and column circuit at each matrix intersection. First signals having a first phase are coupled through a predetermined impedance to all of the row circuits. This impedance is much smaller than a switch-open impedance of one of the switches but much larger than a switch-closed impedance. Second signals having a second phase opposite to the first phase are coupled to each of the column circuits in recurring sequence. The second signals have a sufficient amplitude after coupling through a closed one of the switches to appear on the coupled row circuit with substantially greater amplitude than do the first signals. Row circuit signals on the row circuits are sampled in a recurrent sequence. A phase difference between a row circuit signal sample and the first signal is detected. This phase difference indicates an actuated one of the switches. A signal identifying the actuated switch is produced in response to the second signal, the row circuit signal sample and the detected phase difference.

Accordingly, it is one feature of the present invention that phase shift scanning can be advantageously effected with relatively low frequency signals having frequencies only about an order of magnitude greater than multitone dial column frequencies.

Another feature is that the use of low frequency scanning signals enables the detection of switch operation with less power consumption than is achievable with scanning techniques relying on direct detection of capacitance changes produced by switch actuation.

Yet another feature is that the detected row circuit signal samples are integrated to immunize, to a large extent, the sensitivity of the detector to spurious signals and noise.

A further feature of the present invention is that the use of relatively low frequency scanning signals having frequencies only about an order of magnitude greater than the multitone dial column frequencies results in a decrease in power consumption and thereby enables an array of capacitively coupled switches to be utilized in a multitone pushbutton telephone dial.

Yet a further feature is that the relatively low frequency scanning signals are digital signals which are advantageously converted to analog form to produce the multitone telephone dial signals.

Still a further feature of the present invention is that multiple switch actuations, should they occur, result in inhibiting the transmission of erroneous signals to the central office.

BRIEF DESCRIPTION OF THE DRAWINGS

The aforementioned features and objects of the invention as well as other features and objects will be better understood upon a consideration of the following detailed description and the appended claims in connection with the attached drawings of an illustrative embodiment in which:

FIG. 1 diagrammatically depicts a pushbutton dial switch array and the frequencies assigned to each row and column in the array;

FIG. 2 presents a table of the relative time subintervals for the digital signals used to synthesize the scanning signals and the multitone dial signals;

FIG. 8 is a truth table illustrating the logic signal design used to minimize power consumption; and FIG. 9 illustrates the layout of FIG. 6a through 6d.

DETAILED DESCRIPTION

Figure 3:
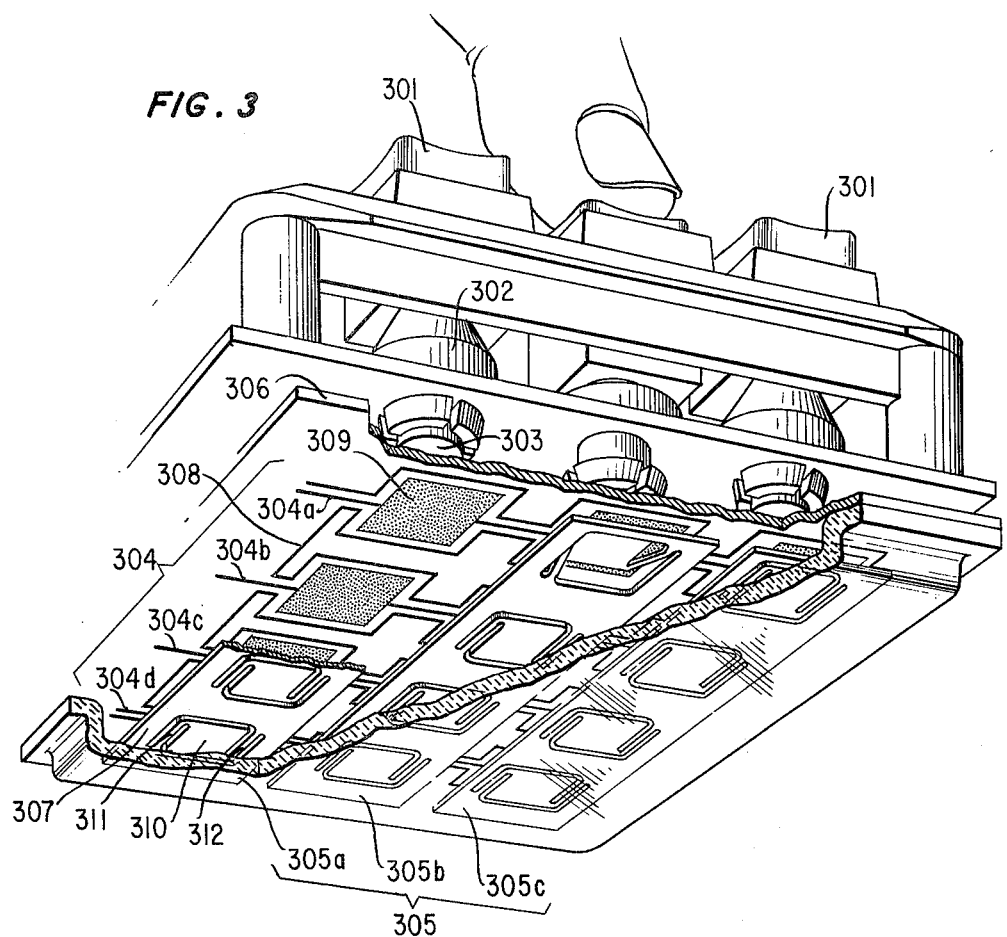
FIG. 3 depicts the dial switch array including interconnected rows of fixedly mounted conductive plates and interconnected columns of movable conductive plates.

In describing in detail the multitone pushbutton dial array scanning circuitry, it is believed that an understanding of the operation of the scanning circuitry will be somewhat simplified by breaking the description into a number of separable but related parts. The first part will describe the considerations which bear on the selection of a master clock frequency. Part two will describe briefly the operation of one of the switches in the dial array. The third part will provide a summary description of the scanning operations with a more detailed description being presented in part four.

1. Frequency Selection

Presently, a twelve pushbutton multitone telephone dialer, diagrammatically shown in FIG. 1, utilizes a "2-out-of-7" code word for the transmission of the identity of a dialed digit to a telephone central office. The 2-out-of-7 code results from a dial arrangement wherein there are four rows and three columns of pushbuttons. Each row, as shown in FIG. 1, is assigned a unique frequency from a low frequency group, whereas each column is assigned a unique frequency from a high frequency group. When a selected pushbutton is depressed the row and column frequencies associated with the row and column location of that pushbutton are transmitted to the central office.

In selecting a master clock frequency for generating each of these tones, a frequency must be picked such that a set of seven integers can be found which, when divided into the master clock frequency, will produce the multitone dial signals within an acceptable tolerance level. The lowest frequency which satisfies these requirements is 126,952 Hz. This frequency, when divided by the frequency division coefficients set out at the top of FIG. 2, will result in multitone dial frequencies which are within 1 Hz of the desired values. By digitally counting down the master clock frequency by the frequency division coefficients noted above, a square wave of the requisite frequency is produced.

Since the amount of power consumed in a digital circuit is related to the number of logic state transitions that occur, the frequency chosen for the master clock should be as low as possible. By utilizing an approach similar to that taught in U.S. Pat. No. 3,787,836 issued to D. W. Hagelbarger on Jan. 22, 1974, the master clock frequency may be cut in half without appreciably sacrificing any accuracy in the production of the multitone dial frequencies. This technique is described in detail in the aforementioned patent but a brief description is included herein to simplify the description of the scanning circuitry. Basically, this technique relies upon a recognition that each of the frequency division coefficients is divisible by a factor of twelve plus a correction term. By making the correction over a two period interval the required multitone frequency accuracy is insured while permitting a reduction in the master clock frequency by a factor of two.

For example, the frequency assigned to column three of the dial is 1477 Hz. The frequency division coefficient for this frequency is 86. This coefficient may be considered as 12×7 plus a correction factor of +2. As noted above, the correction is made over two periods of the multitone frequency. Therefore, if this two period interval is broken down into twelve separate time subintervals and each of these subintervals lasts for seven clock pulse periods the master clock frequency would be counted down by a factor of 84. This is two master clock pulse periods short of what is required. However, by adding a pair of extra master clock pulse periods at some point within the two period multitone signal, the correct countdown frequency is achieved.

The effect of the added or subtracted master clock pulse periods is to generate unwanted harmonics of the desired frequency and also harmonics of one-half the desired frequency since the countdown correction takes place over two periods of the multitone frequency. By performing the correction uniformly over both periods the unwanted harmonics are suppressed to a level well below the desired multitone signal level.

2. Pushbutton Switch Operation

An illustration of the multitone dial switch array is shown in FIG. 3. The switches used in this dial should be inexpensive, rugged, reliable and compatible with low power, high impedance digital logic circuitry. One type of switch which satisfies these requirements is the switch disclosed in my U.S. Pat. No. 3,904,887, issued Sept. 9, 1975 and entitled "Snap-Action Pushbutton Switch". A brief description of the construction and operation of this type of pushbutton switch is included herein to aid in the detailed description of the scanning circuitry.

In this type of magnetically actuated, capacitively coupled pushbutton switch one conductive plate 309 of a capacitor is formed on a fixedly mounted printed circuit board 306. The other capacitor plate is comprised of a magnetically movable conductive plate 310, which is attached to a conductive support strip 307 by cantilever springs 311 and 312. It should be noted that in the dial switch array all of the fixedly mounted plates 309 in a row are electrically interconnected through printed circuits such as 304a through 304d which are referred to collectively as row circuits 304. Similarly, all of the movable plates 310 in a column are electrically interconnected by means of conductive column circuits 305a through 305c which are referred to collectively as column circuits 305. These electrical interconnections of the rows and columns advantageously simplify the complexity of the circuitry used to effect dial scanning.

A pushbutton 301 is located opposite each of the magnetically movable plates 310 with one of the fixedly mounted plates 309 inbetween. On the underside of each pushbutton 301 is a silastic rubber cup spring 302 and a small permanent magnet 303.

In the preferred embodiment of this switch, fixedly mounted plates 309 are covered with a thin dielectric film (not shown). This film constitutes the dielectric material separating the two capacitor plates of any given switch. However, this dielectric film is not required since the phase shift scanning technique renders the switch operable with or without the film.

3. Summary Description of Scanning

Figure 4:
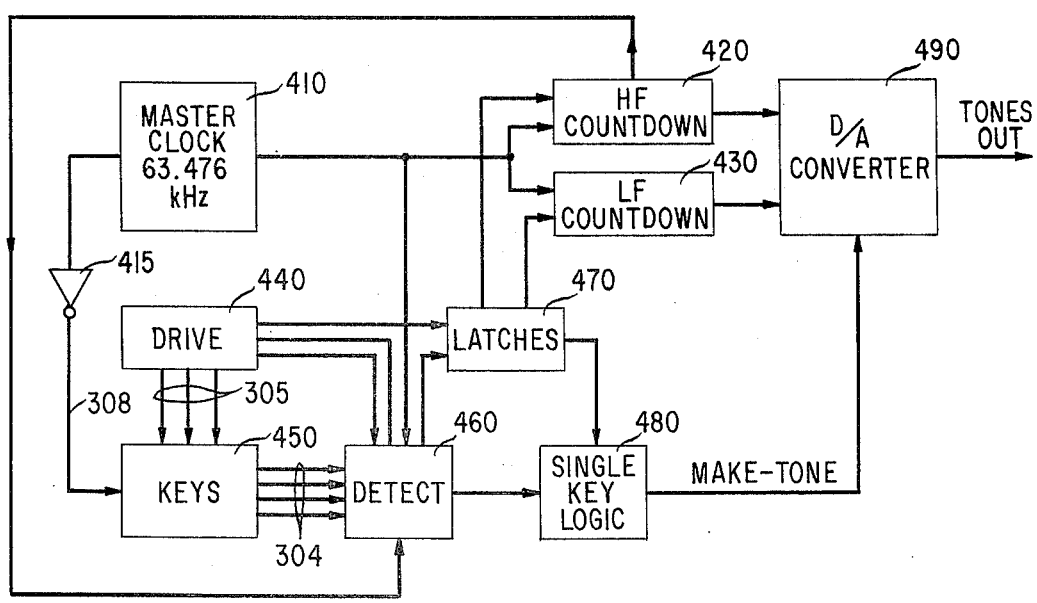
FIG. 4 illustrates a simplified block diagram of multitone pushbutton dial circuitry including the scanning circuitry.

Row and column phase shift scanning of the pushbutton switch array is implemented in accordance with a circuit configuration shown in simplified block diagram form in FIG. 4. The utilization of row and column phase shift scanning results in several advantages. One such advantage is that phase shift scanning permits the use of a single detector which can be advantageously designed to provide enhanced noise margins. Another advantage is that the use of phase shift scanning significantly reduces the serious problems which arise with multiple key depression. Consequently, at the end of any given scan one has unambiguous data that, if a key was depressed, only one key was depressed.

To effect row and column phase shift scanning, the master frequency of 63,476 Hz from a master clock 410, as shown in FIG. 4, is applied to a high frequency countdown circuit 420 and a low frequency countdown circuit 430. One function of the high frequency countdown circuit 420 is to generate digital versions of the three column tones by counting down the master clock frequency by the appropriate frequency division coefficient, as set out in FIG. 2, adjusted by the proper correction factor. In a similar manner, one function of the low frequency countdown circuit 430 is to generate digital versions of the four row tones. An oppositely phased master frequency is produced by inverting the output from the master clock 410 in inverter 415. This phase inverted master frequency is applied continuously through a predetermined capacitive impedance to each of the fixedly mounted plates 309, illustrated in FIG. 3, and included within a block symbolized as a keyboard 450 in FIG. 4. This capacitive impedance is much smaller than a switch-open impedance of one of the switches but much larger than a switch-closed impedance of the switch.

An output from the high frequency countdown circuit 420 is applied to a detector circuit 460 which, in turn, provides the input to a drive circuit 440. Drive circuit 440 sequentially applies a column scanning signal from the high frequency group of digital signals to each of the column circuits 305. The column scanning signals have a phase opposite to the phase of the master frequency signals. These latter signals are capacitively coupled from a guard circuit 308, as shown in FIG. 3, to each of the fixedly mounted plates 309. Guard circuit 308 is spaced apart from each of the fixedly mounted plates 309 by a predetermined distance and nearly surrounds each fixedly mounted plate 309 except for a pair of gaps. These gaps are wide enough to allow for the interconnection of rows of fixedly mounted plates 309 by row circuits 304.

Figure 5:
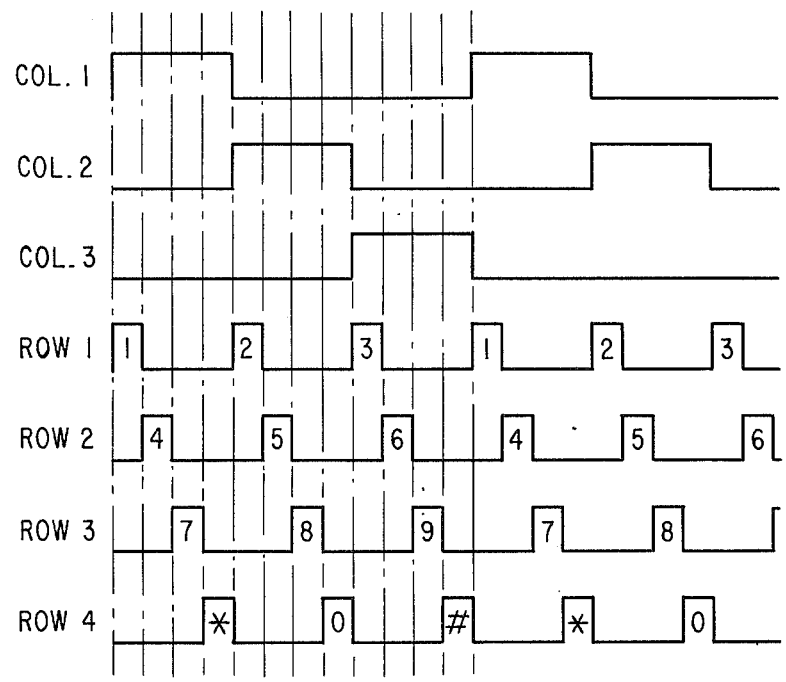
FIG. 5 illustrates a timing chart of the row and column scanning signals.

During the interval when a column scanning signal is applied to column circuit 305a, as shown in FIG. 3, a detector 460 sequentially scans each of the four rows within that column. This is more clearly shown in the timing chart of FIG. 5. At the conclusion of this interval, a column scanning signal is applied to column circuit 305b. Similarly, the four rows within this column are scanned by detector 460. The same technique is followed with respect to the scanning of the four rows within column circuit 305c. At the end of a scan, drive circuit 440 and detector 460 are reset and the scanning is repeated.

If none of the switches are operated, detector 460 is presented with a signal near ground on each of the row circuits 304. However, should a pushbutton 301, as shown in FIG. 3, be depressed during a scan, variable impedance coupled summation signals, which are comprised of the column scanning signal and the master clock signals are produced. The variable impedance coupled summation signals have a phase opposite to the phase of the phase inverter master digital clock signals applied to the fixedly mounted plates 309. Consequently, the signals coupled to the detector 460 when a pushbutton is depressed appear to undergo a phase reversal. This phase reversal is detected and the column scanning signal is correlated with the detected impedance coupled summation signals to identify the address of the actuated switch, that is, its row and column location. This correlation is effected by a latch circuit 470. The latch circuit 470, in turn, provides inputs to both the high frequency countdown circuit 420 and the low frequency countdown circuit 430 which cause these circuits to digitally generate the corresponding row and column frequencies associated with the row and column location of the actuated switch.

In the event that only a single switch is actuated during the course of a scan, this determination being made by a single key detection logic circuit 480, a signal so indicating is delivered to a digital-to-analog converter circuit 490 along with the high frequency and low frequency digital waveforms corresponding to the row and column frequencies of the actuated switch. The digital-to-analog converter 490 converts these digital waveforms into a corresponding analog format for transmission to the central office.

4. Detailed Description of Scanning 4.1 Master Clock

A detailed schematic diagram of the scanning and digital waveform synthesis circuitry is depicted in FIG. 6. Each of the major blocked-in areas corresponds to one of the blocks illustrated in the simplified block diagram of FIG. 4.

Figure 6A:
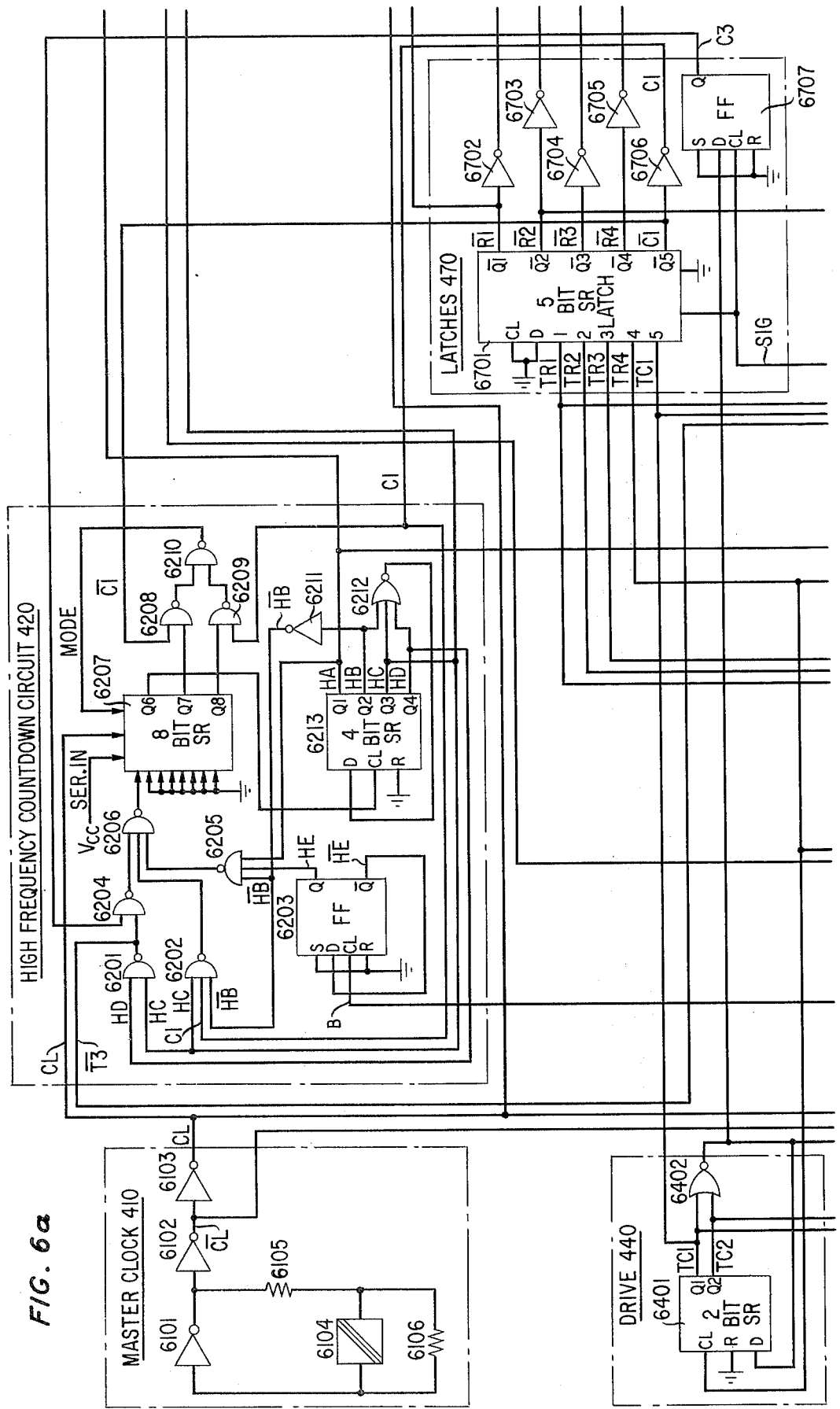
FIGS. 6a through 6d depict a schematic diagram of the scanning and digital waveform synthesis circuitry used in the multitone pushbutton dial.

The master clock 410, shown in FIG. 6a, produces master digital clock signals CL which drive the high frequency countdown circuit 420, the low frequency countdown circuit 430 and the detector circuit 460. The heart of the master clock 410 is a ceramic resonator 6104. One example of a ceramic resonator which may be advantageously used is a PZT6b piezoelectric ceramic resonator manufactured by Clevite Brush Company. Ceramic resonator 6104 is connected in a feedback path around an amplifier 6101. Included in this feedback path is a resistor 6105 which limits the amount of output signal variations coupled back from amplifier 6101 to the ceramic resonator 6104 and thence to the input of amplifier 6101. In one embodiment of the invention the resistor 6105 advantageously had a value of 5.6 K$\Omega$. A DC bias for amplifier 6101 is controlled by a resistor 6106 which, in one embodiment, advantageously has a value of 10 M$\Omega$.

Figure 6B:
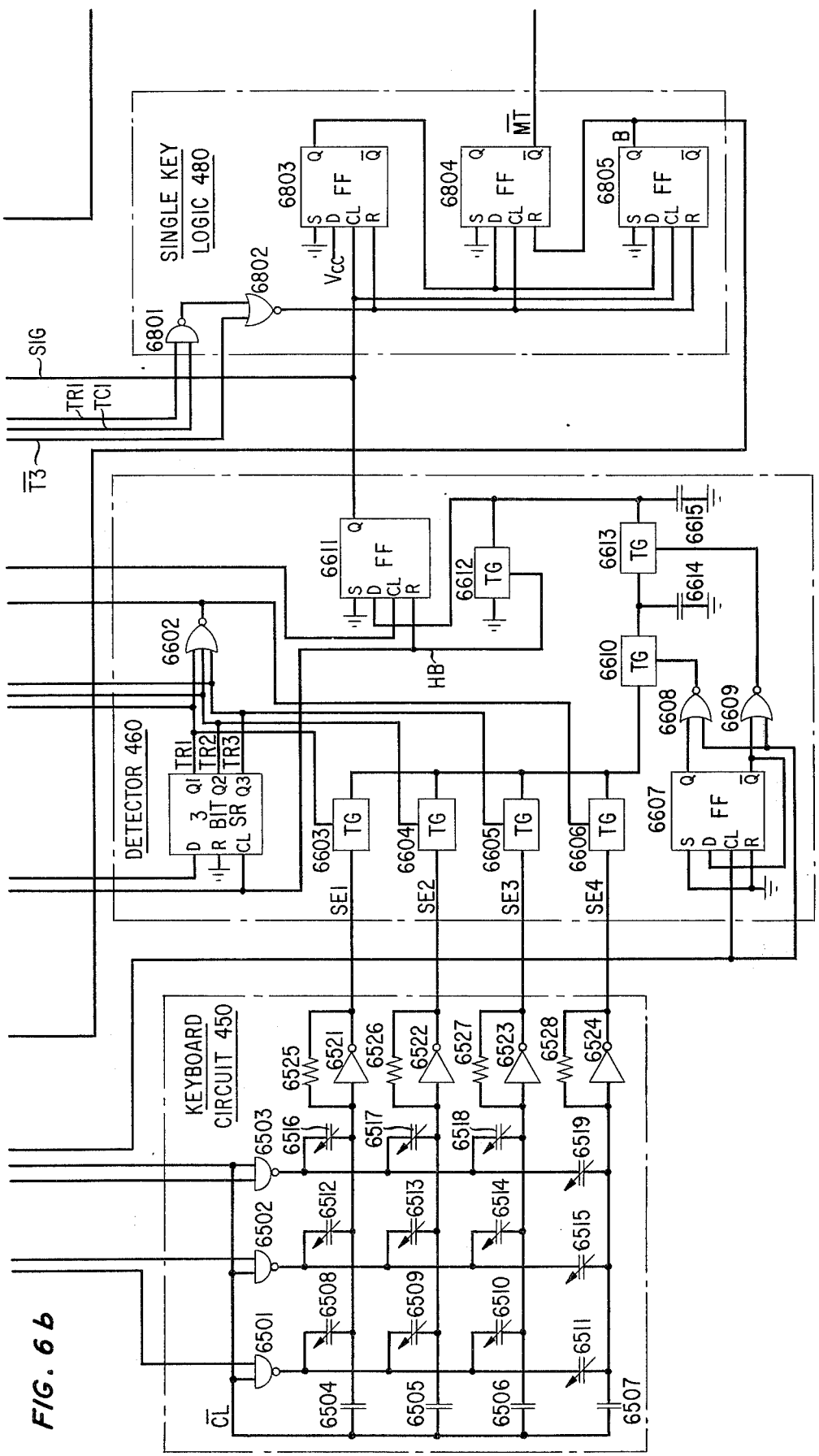
Figure 6C:
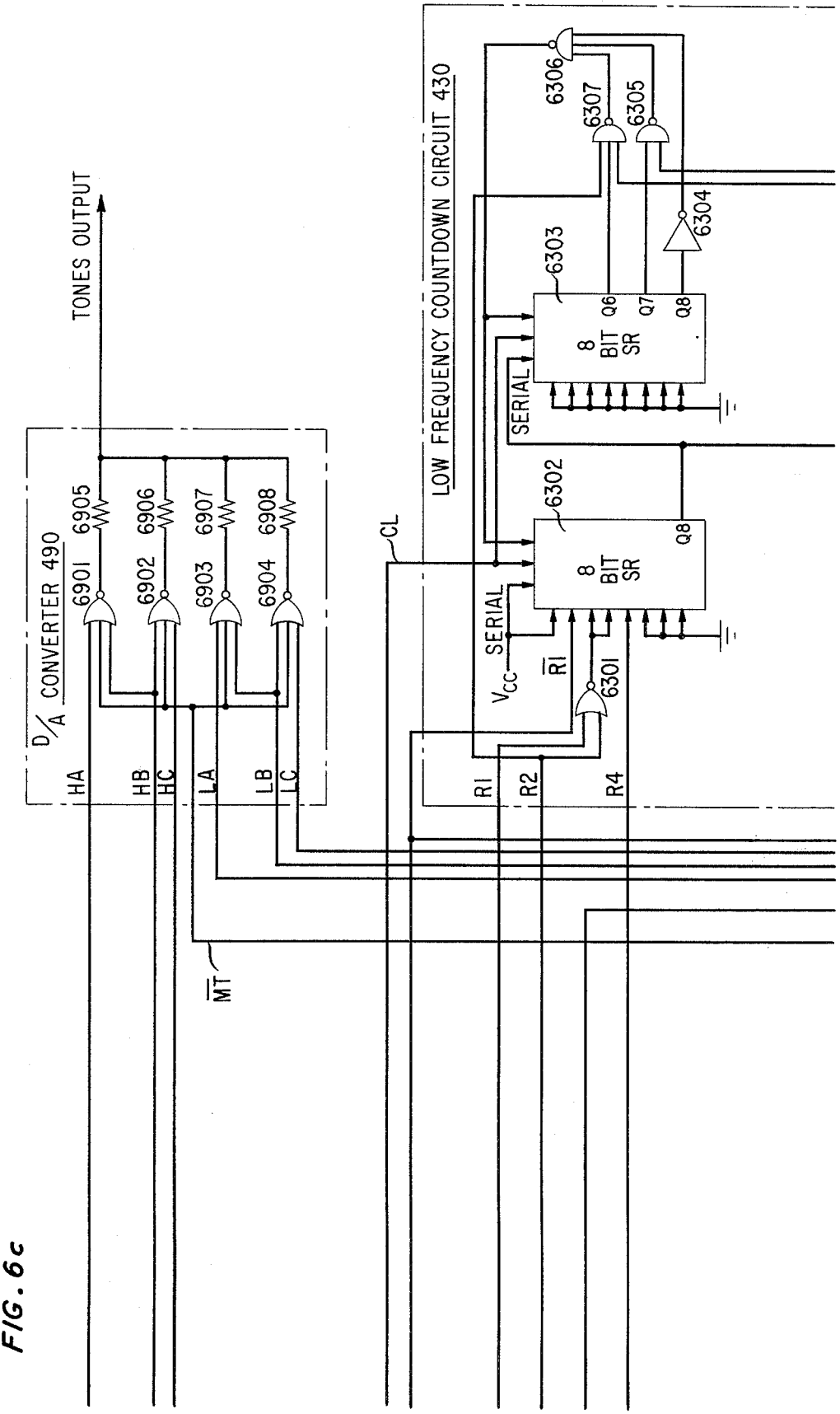
Figure 6D:
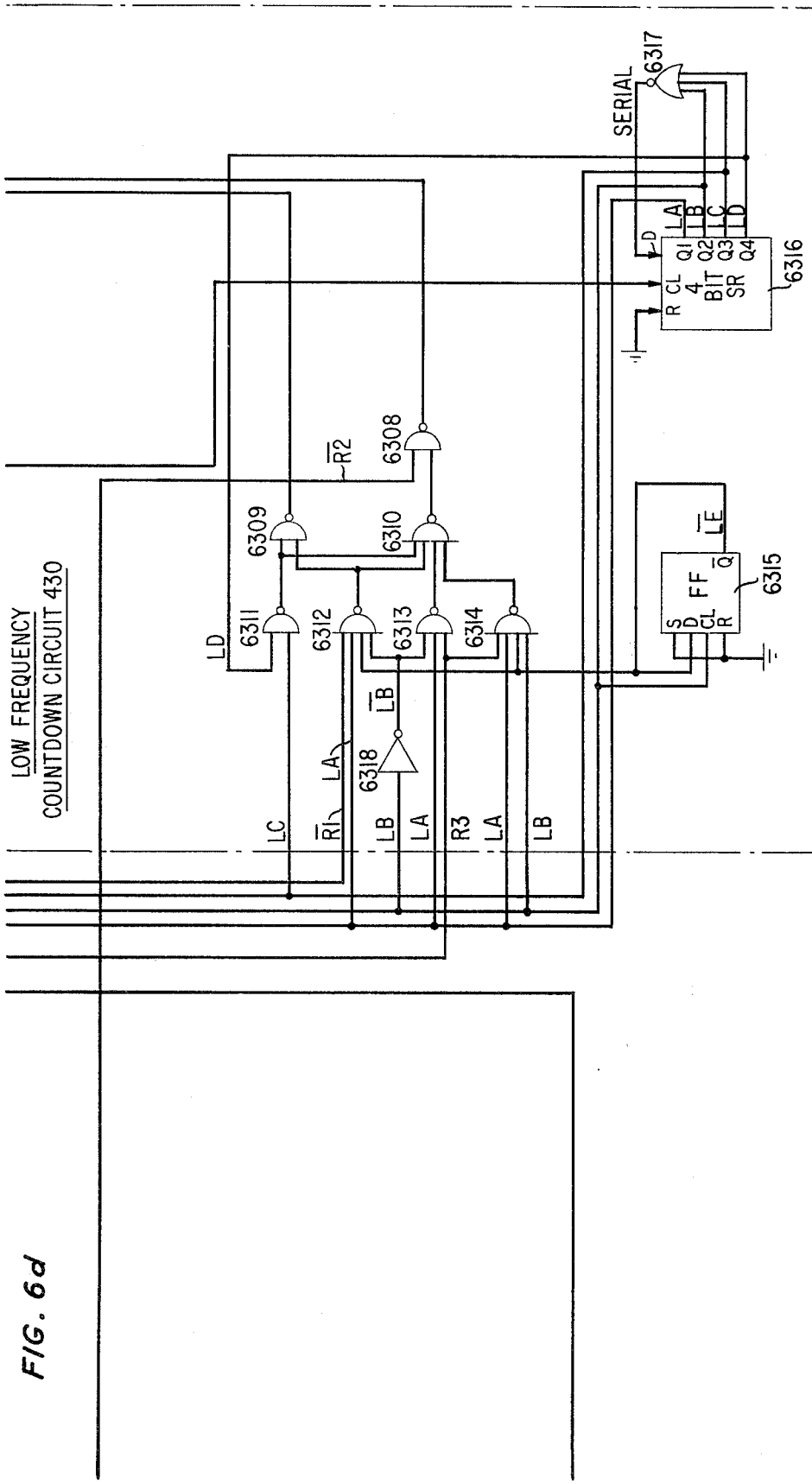

To avoid any loading effects on the ceramic resonator 6104, a pair of tandemly coupled amplifiers 6102 and 6103 are serially connected to the output of amplifier 6101. The first of these amplifiers, amplifier 6102, imparts a phase inversion to the master digital clock signals CL. These phase inverted signals $\overline{CL}$ are coupled through a fixed capacitive impedance to each of the fixedly mounted plates 309, shown in FIG. 3. This fixed impedance coupling is represented in FIG. 6b by capacitors 6504 through 6507. The second of the tandemly coupled amplifiers, amplifier 6103, also imparts a phase reversal to its input signals, but since these signals have been once inverted, the output signals from amplifier 6103 are the master digital clock signals CL.

One example of an amplifier which may be advantageously utilized for amplifiers 6101 through 6103 is a Model 74CO4 inverter manufactured by National Semiconductor Corporation.

4.2 High Frequency Countdown Circuit

High frequency countdown circuit 420 operates on the master clock signals CL to produce one of a group of $n$ digital multitone column frequency signals. The group of $n$ multitone column frequency signals each have a frequency approximately an order of magnitude less than the frequency of the master digital clock signals. Selection of which digital column frequency is to be produced is controlled in accordance with a multitone column frequency address defining an operated pushbutton switch.

The digital multitone column frequencies are generated by dividing the master digital clock signals CL by factors of 7, 8 or 9, as shown in FIG. 2, depending upon which frequency is to be produced. Incident to the generation of the digital column frequencies various column time interval control signals are produced for implementation of column scanning. Each of the column time interval control signals defines one of 12 time subintervals during which the appropriate number of master digital clock signals are counted to digitally synthesize one of the group of $n$ column frequencies.

The key elements for generating the twelve column time interval control signals are a four bit shift register 6213 and a flip-flop 6203. Generation of these signals is fixed, by additional circuitry to be described shortly, in order to limit the number of logic state transitions occurring within each time subinterval and thereby limit the amount of power consumed to a level proportional to the number of logic state transitions. The key elements for controlling the number of master digital clock signals counted during each time subinterval is an eight bit shift register 6207 and NAND gates 6201, 6202, 6204 through 6206. The aforementioned NAND gates decode the column time interval control signals in order to limit the number of master digital clock signals counted by shift register 6207 during any given time subinterval.

An example of a 4-bit shift register which may be advantageously used for shift register 6213 is a Model CA4015 shift register manufactured by RCA. Similarly, an example of an eight-bit shift register which may be advantageously employed for shift register 6207 is a Model CA4014 shift register also manufactured by RCA.

The operation of the high frequency countdown circuit 420 to produce the digitally synthesized column frequencies and the column time interval control signals is best described by way of an example. Assume that a pushbutton in column one of the dial array has been depressed, its operation is to be detected and the assigned multitone signal generated. The frequency to be generated for pushbuttons in this column is 1209 Hz. The countdown factor for this frequency is nine with a correction factor of −3. Therefore, three of the twelve time subintervals used to synthesize this frequency will last for only eight master clock pulse periods.

Further, assume that at the start of the following circuit operations the shift register 6213 and the flip-flop 6203 are cleared and that the column time interval control signals to be generated correspond to the digital signal code shown in a truth table in FIG. 8. It should be noted that at most two logic state transitions occur in any of the codes produced by shift register 6213 which are represented by the entries of columns A through D in the truth table. This counting sequence has been carefully designed so that the number of logic state transitions is kept to a minimum in order to conserve power. Decoding of the column time interval control signals to produce a count control signal and thereby limit the number of master digital clock signals counted by shift register 6207 is implemented in the following manner.

Initially, column control signals HA, HB, HC and HD from shift register 6213 are logical 0s. With the HB, HC and HD signals 0, a NOR gate 6212 is actuated to produce an output signal which is coupled to a data input of shift register 6213. The count in shift register 6213 is initiated in response to a CLK signal from Q6 of shift register 6207. The manner in which the CLK signal is produced at Q6 of shift register 6207 will be treated in a following paragraph.

After one shift period the HA signal out of shift register 6213 becomes 1 and after a second shift period the HB signal becomes a 1. With the HA and HB signals 1, the NOR gate 6212 is inhibited, therefore limiting the number of adjacent 1s in the count to two. This corresponds to the digital signal code specified for time subinterval number one in the truth table of FIG. 8.

With both the HA and HB signals 1 and the HC, HD and HE signals 0, HE being 0 by virtue of the single key logic circuit 480 not being activated to produce a B input signal to the flip-flop 6203, the NAND gate 6206 is inhibited. This result follows since with the HC signal 0 NAND gates 6201 and 6202 are actuated. Also, the HE signal or an inverted HB signal $\overline{HB}$ being 0 causes NAND gate 6205 to actuate. The HB signal is produced by applying the $\overline{HB}$ signal to an inverter 6211.

Recalling the initial assumption that a pushbutton in column one was depressed, a column three signal C3 from latch circuit 470 which is applied to NAND gate 6204 is 0 thereby actuating this gate. With NAND gates 6201, 6202, 6204 and 6205 actuated, NAND gate 6206 is inhibited. Consequently, all of the inputs to the shift register 6207 are 0s with the exception of a 1 applied via a SERIAL IN lead to a serial data input from a source $V_{cc}$ (not shown).

Under this set of input conditions shift register 6207 will produce an output at Q6 after seven master clock pulse periods, at Q7 after eight master clock pulse periods and at Q8 after nine master clock pulse periods. It should be noted that then the SERIAL IN bit reaches Q6 of shift register 6207 it provides the CLK signal to shift register 6213. This CLK signal increments the count in shift register 6213 to produce the digital signal code corresponding to time subinterval number two shown in the truth table in FIG. 8.

After nine master clock pulse periods the Q8 output of shift register 6207 goes to a 1 and, since the pushbutton initially assumed to be depressed is in column one, both inputs to a NAND gate 6209 are 1 thereby inhibiting it. With a 0 as one input to a NAND gate 6210 this gate is actuated and a 1 is coupled back on a MODE lead to a mode control input of shift register 6207 to initiate a new counting sequence. It should be noted that the output at Q7 of shift register 6207 has no effect during this time subinterval since an inverted column one signal $\overline{C1}$ from latch circuit 470 inhibits a NAND gate 6208 thereby preventing the actuation of the NAND gate 6210 until the output from shift register 6207 reaches Q8. The result of taking the output of Q8 of shift register 6207 is that nine clock pulse periods are needed to complete the count. This is the requisite number of clock pulse periods for time subinterval number one for a column one frequency of 1209 Hz.

The count in shift register 6213 having been incremented by one, the HA, HD and HE signals are 0s and the HB and HC signals are 1s. With this set of input conditions NAND gates 6201, 6202, 6204 and 6205 are all actuated. Consequently, NAND gate 6206 is inhibited. As was the case for time subinterval number one, nine master clock pulse periods will be required before an output appears at Q8 of shift register 6207. Once again it should be recalled that during the shift operations in shift register 6207, when an output appears at Q6, the count in shift register 6213 is incremented. Consequently, the digital signal code from shift register 6213 now takes the form of that specified for time subinterval number three in the truth table shown in FIG. 8.

For time subinterval number three, the HC and HD signals are 1s and the HA, HB and HE signals are 0s. With the HC and HD signals both 1, NAND gate 6201 is inhibited and NAND gate 6204 is actuated. Also, NAND gate 6202 is inhibited and this in turn actuates NAND gate 6206. With NAND gate 6206 actuated, only eight master clock pulse periods will be required for a signal to appear at Q8 of shift register 6207. This is the requisite number of clock pulse periods for time subinterval number three for a column one frequency of 1209 Hz.

Following a similar set of logical signal manipulations for the remaining nine time subintervals a digital waveform having the time structure set out in FIG. 2 for a column one frequency is produced. That is, the first two time subintervals persist for nine master clock pulse periods followed by a third time subinterval lasting for eight master clock pulse periods and so on.

The column two and column three frequencies and their column time interval control signals are generated in an analogous manner.

4.3 Low Frequency Countdown Circuit

Low frequency countdown circuit 430 is similar to the high frequency countdown circuit 420 in that it operates on the master digital clock signals CL to produce one of a group of $m$ digital multitone row frequency signals. The group of $m$ multitone row frequency signals each have a frequency approximately two orders of magnitude less than the frequency of the master digital clock signals. Selection of which digital row frequency is to be produced is controlled in accordance with a multitone row frequency address defining an operated pushbutton switch.

The digital multitone row frequencies are generated by dividing the master digital clock signals CL by countdown factors of 11 through 16, as shown in FIG. 2, depending upon which frequency is to be produced. Incident to the generation of the digital row frequency signals, various row time interval control signals are produced. Each of the row time interval control signals defines one of 12 time subintervals during which the appropriate number of master digital clock signals are counted to digitally synthesize one of the group of $m$ row frequency signals.

The twelve row time interval control signals are generated by a four-bit shift register 6316 and a flip-flop 6315 which operate together to form a 12-bit counter. As was the case in the high frequency countdown circuit 420, the generation of the row time interval control signals is fixed, by a NOR gate 6317, in order to limit the number of logic state transitions occurring within each time subinterval and thereby limit the amount of power consumed to a level proportional to the number of logic state transitions.

The circuitry for controlling the number of master digital clock signals CL counted during each time subinterval is comprised of a pair of 8-bit shift registers 6302 and 6303, a NOR gate 6301, a pair of inverters 6304 and 6318, and NAND gates 6305 through 6314. NAND gates 6305 through 6314 decode the row time interval control signals and, in conjunction with the NOR gate 6301 and latch circuit 470, produce a count control signal for limiting the number of master digital clock signals counted by shift registers 6302 and 6303 during any given time subinterval.

Operation of the low frequency countdown circuit 430 to produce the digitally synthesized row frequency signals and the row time interval control signals follows in a parallel manner the operation of the high frequency countdown circuit 420. As a result, a detailed description of the signal flow is believed to be unnecessary. However, it should be noted that since the countdown factors can take on any integer value between 11 and 16, shift registers 6302 and 6303 are tandemly coupled together in order to cover this range. Also, since at least 11 and as many as 16 master digital clock pulse periods are needed to define each time subinterval, the count control signal is selectively routed to at least one of the second through fifth parallel inputs of shift register 6302, the selection being controlled in accordance with the number of master digital clock pulses to be counted.

4.4 Drive Circuit

Column scanning of the switch array is implemented under the control of the drive circuit 440 which selectively routes a column scanning signal to each of the column circuits 305, as shown in FIG. 3. Drive circuit 440, as shown in FIG. 6a, is comprised of a two-bit shift register 6401 and a NOR gate 6402. One type of NOR gate which may be advantageously utilized for NOR gate 6402 is a model CA4001 NOR gate manufactured by RCA.

At the end of a previous column scan the detector circuit 460 generates a row scan selection signal which is applied to a clock input of the shift register 6401. NOR gate 6402 develops a column scan initiation signal which is applied to a data input of shift register 6401. These signals actuate shift register 6401 to produce a column one scanning signal TC1 which appears at a Q1 output. The column one scanning signal TC1 along with inverted master digital clock signals $\overline{CL}$ are applied to a NAND gate 6501 in keyboard circuit 450, thereby periodically actuating this gate and, in turn, energizing column circuit 305a, as shown in FIG. 3. In addition, the column one scanning signal TC1 inhibits NOR gate 6402 thereby preventing the application of a column three scanning signal TC3 to column three of the switch array. During the time interval when the column one scanning signal is applied to the column circuit 305a, each of the four row circuits 304 within that column are scanned by detector 460. The manner in which detector 460 effects row scanning will be described in Section 4.6.

At the end of the column one scan a new row scan selection signal is generated by detector 460. In response to this signal, shift register 6401 produces a column two scanning signal TC2 which appears at a Q2 output. The column two scanning signal TC2 along with inverted master digital clock signals $\overline{CL}$ are applied to a NAND gate 6502 in keyboard circuit 450 periodically actuating this gate and, in turn, energizing column circuit 305b. Similar to the application of the column one scanning signal TC1 to the NOR gate 6402, the column two scanning signal TC2 inhibits NOR gate 6402 thereby preventing the application of the column three scanning signal TC3 to column three. Moreover, during the time interval when the column two scanning signal TC2 is applied to column circuit 305b, each of the four row circuits 304 within that column are scanned by detector 460.

At the end of the column two scan a new row scan selection signal is generated by detector 460. In response to this signal, the count in shift register 6401 is again incremented and NOR gate 6402 is now actuated to produce the column three scanning signal TC3. In addition, the output from NOR gate 6402 is coupled back to the data input of shift register 6401 to initiate a new column scanning sequence upon receipt of a new row scan selection signal. The column three scanning signal TC3 and the inverted master digital clock signals $\overline{CL}$ are applied to a NAND gate 6503 in keyboard circuit 450, thereby periodically actuating this gate and, in turn, energizing the column circuit 305c. Again, during the time interval that the column three scanning signal TC3 is applied to column circuit 305c the four row circuits 304 are scanned by detector 460.

4.5 Keyboard Circuit

As described in Section 3 above, the phase inverted master digital clock signals $\overline{CL}$ are applied to the guard circuit 308, as shown is FIG. 3, and these signals are capacitively coupled to each of the fixedly mounted plates 309. This capacitive coupling effect is schematically represented in FIG. 6 by capacitors 6504 through 6507. Also, as noted previously in Section 3, an oppositely phased column scanning signal is sequentially applied to each of the columns of interconnected magnetically movable plates 310 which are represented schematically in FIG. 6 as variable capacitors 6508 through 6519.

Upon depression of any given pushbutton the column scanning signal is coupled through the variable capacitive impedance to the fixedly mounted plate 309 of that switch. The capacitive coupling of the column scanning signal to the fixedly mounted plate 309 produces impedance coupled summation signals and these signals have a phase opposite to that of the phase inverted master digital clock signals $\overline{CL}$ which normally appear on row circuits 304, as shown in FIG. 3. During row scanning, to be described subsequently, the impedance coupled summation signals are coupled out of row circuits 304 through one of a parallel group of inverters 6521 through 6524. Each of the inverters 6521 through 6524 has a resistor 6525 through 6528, respectively, connected between its input and output for shifting the inverter input signal level to bring it within a linear operating range of the inverter. In one embodiment resistors 6525 through 6528 advantageously had values of 3.9 M$\Omega$.

4.6 Detector Circuit

Detector circuit 460 sequentially and recurrently scans the row circuits 304 during the time interval when a column scanning signal is applied to a column to detect a phase variation in one or more of the variable impedance coupled summation signals appearing at the output of inverters 6521 through 6524. It should be noted that a phase variation occurs only if one of the magnetically movable plates 310 is moved to a position adjacent to its corresponding fixedly mounted plate 309 upon switch actuation.

Row scanning is effected under the control of a shift register 6601 which generates row scan selection signals TR1 through TR3 in response to the application of a row scan initiation signal to a data input and column time interval control signals to a clock input of the shift register 6601. A fourth row scan selection signal TR4 is developed by applying row scan selection signals TR1 through TR3 to a NOR gate 6602 which is inhibited so long as any one of these three signals is present at the gate input. The actuation of NOR gate 6602 enables the scanning of the fourth row circuit 304d, as well as initiating a new row scanning sequence.

Sequential application of row scan selection signals TR1 through TR4 to transmission gates 6603 through 6606 sequentially actuates these gates and allows any variable impedance coupled summation signals originating from a depressed pushbutton to be coupled to a transmission gate 6610. Transmission gate 6610, in combination with a transmission gate 6613 and capacitors 6614 and 6615, form a "dipper and bucket" integrator. The use of dipper and bucket integration permits a predetermined number of variable impedance coupled summation signals to be accumulated during a single row scan with the result that the detector circuit 460 provides an enhanced noise margin and is less susceptible to any spurious signals that may be present.

Operation of the dipper and bucket integrator is controlled by alternate master digital clock signals CL produced by the toggling of a flip-flop 6607 which selects which one of two NOR gates 6608 and 6609 is to be actuated. The actuation of transmission gate 6610 first in time permits a single impedance coupled summation signal to charge the "dipper" capacitor 6614 which advantageously has a value of 10 pf. During this charging time transmission gate 6613 is inhibited. Transmission gate 6610 is then inhibited and, on the next master clock pulse, transmission gate 6613 is actuated allowing the charge on dipper capacitor 6614 to be transferred to the "bucket" capacitor 6615 which advantageously has a value of 100 pf. The successive transfer of charge from the dipper capacitor 6614 to the bucket capacitor 6615 results in a number of impedance coupled summation signals being integrated. This result obtains since a number of clock pulses are applied to NAND gate 6501, for example, as shown in FIG. 6b, during the time interval when the column scanning signal is also applied to this gate. Consequently, NAND gate 6501 is inhibited numerous times with the effect that a number of column scanning samples are generated. These samples, in turn, produce the numerous inpedance coupled summation signals which are integrated to ensure accurate detection of an actuated switch.

When the integrated signal on bucket capacitor 6615 reaches a predetermined threshold signal level, this signal, in conjunction with a first column time interval control signal from high frequency countdown circuit 420, actuates a flip-flop 6611 producing a key down signal which is applied to the single key logic circuitry 480. After the key down signal is generated, the charge on the bucket capacitor 6615 is dumped to ground by opening a transmission gate 6612 in response to a second column time interval control signal from the high frequency countdown circuit 420.

4.7 Latch Circuit

A row and column address, defining an operated pushbutton switch upon detection of a phase variation in the impedance coupled summation signals, is obtained by correlating the four row scan selection signals and two of the three column scanning signals in latch circuit 470. The third column scanning signal need not be used since the column address of a switch scanned by this signal can be advantageously obtained by default. That is, if an operated pushbutton switch is detected and it is not in one of the two columns which have their scanning signals routed to latch circuit 470, then, of necessity, the operated pushbutton switch must be in the remaining column.

The key elements of the latch circuit 470, which effect the correlation of the row scan selection signals and the column scanning signals, are a shift register latch 6701 and a flip-flop 6707. One example of a shift register latch which may be advantageously used for latch 6701 is a model CA4018 ]latch manufactured by RCA. A shift register latch of this type has five parallel jam inputs and clock, data, reset, and preset enable inputs. The four row scan selection signals and one of the column scanning signals are applied to the five jam inputs with the other column scanning signal applied to a data input of flip-flop 6707.

When a key-down signal is produced by detector 460, it is coupled to the preset enable input of latch 6701 and to a clock input of flip-flop 6707. The key-down signal actuates latch 6701 and flip-flop 6707 causing whatever row and column signal information appears at the latch jam inputs and the flip-flop data input to be coupled out in parallel. Four of the five output signals from latch 6701 are inverted by inverters 6702 through 6705. These signals enable the decoding of the row time interval control signals generated in the low frequency countdown circuit 430. These decoded signals, in turn, control the number of master digital clock pulses counted by the low frequency countdown circuit 430 to product the low frequency defining the address of the operated pushbutton switch. The fifth output from latch 4701 is inverted by an inverter 6706. This signal, in conjunction with the output signal from flip-flop 6707, enables the decoding of the column time interval control signals generated in the high frequency countdown circuit 420. These decoded signals, in turn, control the number of master digital clock pulses counted to produce the column frequency defining the address of the operated pushbutton switch.

4.8 Single Key Detection

The determination of whether two or more pushbutton switches are operated together is effected by the single key logic circuitry 480. In the event two or more switches are operated, the single key logic circuitry 480 does not product a make-tone signal. The absense of a make-tone signal inhibits the conversion of the digital multitone row and column frequency signals to an analog signal format.

Implementation of the single key logic function is effected, as shown in FIG. 6b, by flip-flops 6803 through 6805. When a key-down signal is generated by detector 460, it is coupled to a clock input of flip-flops 6803 and 6805. A predetermined reference voltage from a source $V_{cc}$ (not shown) is continuously applied to a data input of flip-flop 6803. When the key-down signal appears at the clock input of flip-flop 6803, a key control signal is produced. This signal is coupled to data inputs of flip-flops 6804 and 6805. If only one key-down signal is produced by detector 460, during a given scan sequence, flip-flop 6804 generates a make-tone signal upon receipt of an initialization signal at a clock input. This initialization signal is generated at the beginning of a scan sequence by applying the column one scanning signal TC1 and a row scan selection signal TR1 to a NAND gate 6801. The output from NAND gate 6801 is, in turn, applied to a NOR gate 6802 along with a time slot signal T3 produced during the decoding of the column time interval control signals by high frequency countdown circuit 420. The initialization signal also resets flip-flops 6803 and 6805.

If two or more key-down signals are produced by detector 460 during a scan sequence, the first one actuates flip-flop 6803 supplying the key control signal to the data inputs of flip-flops 6804 and 6805. The second key-down signal is applied to clock inputs of flip-flops 6803 and 6805 and, in response to the second key-down signal, flip-flop 6805 actuates producing an output signal which is applied to a reset input of flip-flop 6804. Flip-flop 6804 is reset thereby inhibiting the generation of the make-tone signal. By inhibiting the generation of the make-tone signal, D/A converter 490 is prevented from converting the digital row and column frequency signals to an analog format. This is the desired result since these signals would be erroneous in view of the multiple switch actuations.

4.9 Digital to Analog Conversion

Conversion of the multitone row and column frequency signals to analog format for subsequent transmission to a telephone central office is effected by D/A converter 490 which is comprised of two pairs of NOR gates 6901 through 6904. The first pair of NOR gates 6901 and 6902 convert the column frequency signals generated by high frequency countdown circuit 420 to analog form, whereas the second pair of NOR gates 6903 and 6904 convert the row frequency signals generated by low frequency countdown circuit 430 to analog form. Each of the NOR gates 6901 through 6904 has one terminal of a resistor 6905 through 6908, respectively, serially coupled to its output. The other terminal of these resistors are connected together to provide a common output.

Figure 7:
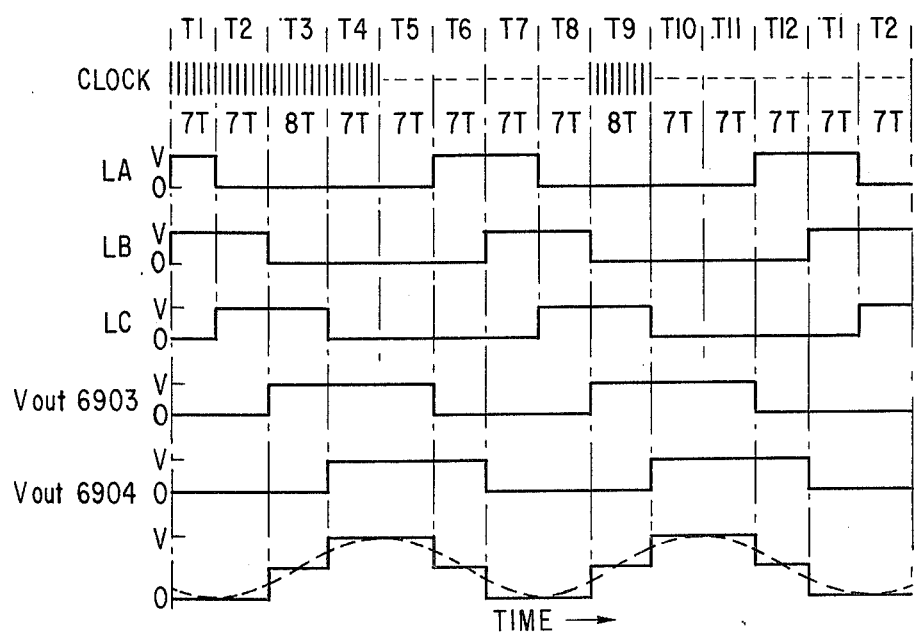
FIG. 7 illustrates an example of the construction of an analog tone from the digital scanning signals.

The conversion of a digital low frequency signal by NOR gates 6903 and 6904 is illustrated by the waveforms shown in FIG. 7. Signals LA and LB, which are subcombination signals of the row time interval control signals, are applied to inputs of NOR gate 6903. Similarly, signals LB and LC are applied to inputs of NOR gate 6904. Each of the signals LA through LC illustrates the previously described concept of having the logical 1's appearing in the row time interval control signal code adjacent to one another during a single time subinterval of the digital waveform to be synthesized in order to limit power consumption. It should also be recalled that the digital waveforms are synthesized over two periods which are spanned by the 12 time subintervals. This is illustrated by the clock waveforms appearing at the top of FIG. 7.

By combining signals LA and LB in NOR gate 6903 when the make-tone signal is applied, the waveform designated $V_{out}$ 6903 in FIG. 7 is produced. Correspondingly, the waveform designated $V_{out}$ 6904 is produced by combining signals LB and LC in NOR gate 6904 when the make-tone signal is applied. The addition of these two digital waveforms at the common summing point for resistors 6907 and 6908 produces an analog replica of the row frequency signal defining the row location of the operated pushbutton switch.

The conversion of the column frequency signals is effected in a parallel manner and no further discussion with regard thereto is believed necessary.

In all cases it is to be understood that the above described embodiment is illustrative of but a small number of many possible specific embodiments which can represent applications of the principles of the invention. Thus, numerous and various other embodiments can readily be devised in accordance with these principles by those skilled in the art without departing from the spirt and scope of the invention.

What is claimed is:

1. Circuitry for scanning a plurality of switches, each of said switches having a varaible impedance coupling between a fixedly mounted conductive plate and a movable conductive plate spaced apart from said fixedly mounted plate, said switches being arranged in a matrix of rows and columns with all of said fixedly mounted plates in a row electrically connected together and all of said movable plates in a column electrically connected together, said scanning circuitry including:
    means for generating master digital clock signals having a predetermined frequency and phase $\phi$;
    means for coupling said master digital clock signals through a predetermined impedance to said fixedly mounted plates;
    means, responsive to said master digital clock signals, for producing column scanning signals having a phase $\phi'$;
    means for sequentially and recurrently applying said column scanning signals to each of said columns of said movable plates;
    means for sequentially detecting on each of said rows of fixedly mounted plates variable impedance coupled summation signals comprised of said column scanning signal and said master digital clock signals, said impedance coupled summation signals having a phase opposite to said phase of said master digital clock signals, said summation signals being produced by a decrease in impedance upon a decrease in spacing between any plate pair; and
    means for correlating said summation signals and said column scanning signals to define an operated switch.

2. The scanning circuitry in accordance with claim 1 wherein the means for generating master digital clock signals further includes:
    an amplifier having an input and an output;
    a resonator electrically connected in a feedback path between said amplifier output and its input, said feedback path coupling signal variations at said amplifier output back to said amplifier input;
    means, included in said feedback path, for limiting an amount of said amplifier output signal variations coupled back to said amplifier input; and
    means for controlling a DC bias signal at said amplifier input.

3. The scanning circuitry in accordance with claim 1 wherein the means for coupling said master digital clock signals through a predetermined impedance to said fixedly mounted plates includes:
    a conductive circuit path spaced apart from each of said fixedly mounted plates by a predetermined distance, said conductive circuit path lying in a plane containing said fixedly mounted plates and nearly surrounding each of said fixedly mounted plates except for first and second gaps of a specified width.

4. The scanning circuitry in accordance with claim 1 wherein the means for producing column scanning signals includes:
    means for counting down said master digital clock signals to produce, during a predetermined time interval, one of a group of n digital multitone column frequency signals, said group of $n$ multitone column frequency signals each having a frequency approximately an order of magnitude less than said frequency of said master digital clock signals.

5. The scanning circuitry in accordance with claim 4 wherein the means for counting down said master digital clock signals to produce one of a group of $n$ digital multitone column frequency signals includes:
    means for generating, within said predetermined time interval, a plurality of column time interval control signals, each of said column time interval control signals defining a time subinterval; and
    means, responsive to each of said column time interval control signals, for controlling a predetermined number of master digital clock signals counted during each time subinterval.

6. The scanning circuitry in accordance with claim 5 wherein the means for generating a plurality of column time interval control signals includes:
    means for fixing a number of logic state transitions occurring within each of said time subintervals in order to limit power consumption to a level proportional to said number of logic state transitions.

7. The scanning circuitry in accordance with claim 6 wherein the means for controlling a predetermined number of master digital clock signals counted during each time subinterval includes:
- a shift register having a clock input, a serial data input, a mode control input, and a plurality of parallel inputs arranged in increasing order from 1 to $n$, said shift register further having first, second, and third buffered outputs;
- means for coupling said master digital clock signals to said shift register clock input;
- means for supplying a reference voltage signal to said shift register serial data input;
- means for decoding, during each of said time subintervals, said column time intervals control signal corresponding thereto to produce a count control signal;
- means for coupling said count control signal to said shift register first parallel input;
- means for maintaining said shift register second through $n^{th}$ parallel inputs at a reference ground potential;
- means for coupling an output signal produced at said shift register first buffered output to said column time interval control signal generating means;
- combinational logic means, partially activated by output signals produced at said shift register second and third buffered outputs, for producing a reset signal in accordance with said count control signal; and
- means for coupling said reset signal to said shift register mode control input.

8. The scanning circuitry in accordance with claim 5 further including:
- means for counting down said master digital clock signals to produce, during a predetermined time interval, one of a group of $m$ digital multitone row frequency signals, said group of $m$ multitone row frequency signals, each having a frequency approximately two orders of magnitude less than said master digital clock signal frequency;
- means for converting said digital multitone row and column frequency signals defining said operated pushbutton switch to an analog multitone signal; and
- means for inhibiting said converting means in the event that at least two pushbutton switches are operated together.

9. The scanning circuitry in accordance with claim 8 wherein the means for counting down said master digital clock signals to produce $m$ digital multitone row frequency signals includes:
- means for generating within a predetermined time interval a plurality of row time interval control signals, each of said time interval control signals defining a time subinterval; and
- means, responsive to each of said row time interval control signals, for controlling a predetermined number of master digital clock signals counted during each time subinterval.

10. The scanning circuitry in accordance with claim 9 wherein the means for converting said digital multitone row and column frequency signals defining said operated pushbutton switch to an analog multitone signal includes:
- first and second pairs of NOR gates, each of said NOR gates having a plurality of inputs and an output;
- means for coupling predetermined subcombinations of said column time interval control signals to said inputs of said first pair of NOR gates and predetermined subcombinations of said row interval control signals to said inputs of said second pair of NOR gates; and
- means for combining all of said NOR gate outputs to produce a common output, said analog multitone signal being produced at said common output.

11. The scanning circuitry in accordance with claim 9 wherein the means for generating a plurality of row time interval control signals includes:
- means for fixing a number of logic state transitions occurring within each of said time subintervals in order to limit power consumption to a level proportional to said number of logic state transitions.

12. The scanning circuitry in accordance with claim 9 wherein the means for controlling a predetermind number of master digital clock signals counted during each time subinterval includes:
- first and second shift registers, each having a clock input, a serial data input, a mode control input, and a plurality of parallel inputs arranged in increasing order from 1 to $n$, said first shift register having at least one buffered output and said second shift register having at least first, second, and third buffered outputs;
- means for coupling said master digital clock signals to said first and second shift register clock input;
- means for supplying a reference voltage signal to said first shift register serial data input and said first parallel input;
- means for coupling said first shift register buffered output to said second shift register serial data input and to said row time interval control signal generating means;
- means for decoding, during each of said time subintervals, said corresponding row time interval control signal to produce a count control signal;
- means for coupling said count control signal to one of said first shift register second through fifth parallel inputs;
- means for maintaining said first shift register sixth through $n^{th}$ parallel inputs and said second shift register first through $n^{th}$ parallel inputs at a reference ground potential;
- combinational logic means, partially activated by output signals produced at said second shift register first, second, and third buffered outputs, for producing a reset signal in accordance with said count control signal; and
- means for coupling said reset signal to said first and second shift register mode control input.

13. The scanning circuitry in accordance with claim 8 wherein the means for inhibiting said converting means in the event that at least two pushbutton switches are operated together includes:
- a conversion control flip-flop for producing a make-tone control signal to partially activate said converting means, said conversion control flip-flop having a data input, a clock input and a reset input;
- means, included in said detecting means, for producing key-down signals indicating the detection of operated pushbutton switches, said key-down signals being applied to said flip-flop clock input;
- means, responsive to a first key-down signal, for generating a key control signal, said key control signal being applied to said flip-flop data input to partially activate said conversion control flip-flop in the event operation of a first pushbutton switch is detected during a scan sequence;

means, responsive to said key control signal, and a second key-down signal for producing a reset signal, said reset signal being applied to said flip-flop reset input to inhibit production of said make-tone control signal thereby deactivating said converting means during a scan sequence; and control circuit means for generating an initialization signal to reset said key control signal generating means and said reset signal producing means at the beginning of a following scan sequence.

14. The scanning circuitry in accordance with claim 13 wherein the means for generating a key control signal includes:

a flip-flop having a data input, a clock input and an output;

means for coupling said key-down signal to said clock input;

means for supplying a predetermined reference voltage to said data input; and means for coupling said key control signal generated at said flip-flop output to said conversion control flip-flop data input.

15. The scanning circuitry in accordance with claim 14 wherein the means for producing a reset signal includes:

a flip-flop having a data input, a clock input and an output;

means for coupling said key-down signal to said clock input;

means for coupling said key control signal to said data input; and means for coupling said reset signals produced at said flip-flop output to said conversion control flipflop reset input.

16. The scanning circuitry in accordance with claim 1 wherein the means for sequentially and recurrently applying said column scanning signals to each of said colunns of said movable plates includes:

a plurality of coincidence gates, one such gate for each of said columns to be scanned, each of said gates having a first and second input and an output;

means for coupling phase inverted master digital clock signals to each gate first input;

means for selectively routing said column scanning signals to each gate second input, each of said gates being actuated upon a signal difference of said column scanning signal and said phase inverted master digital clock signals; and means for coupling each gate output to a corresponding column of said movable plates electrically connected together.

17. The scanning circuitry in accordance with claim 16 wherein the means for selectively routing said column scanning signals includes:

a shift register having a data input, a clock input, and a reset input, said shift register developing at least first and second sequential output signals at first and second outputs, respectively, upon receipt of a column scan initiation signal and row scan selection signals;

means, included in said detecting means, for generating said row scan selection signals;

means for coupling said row scan selection signals to said shift register clock input;

means for maintaining said shift register reset input at a reference ground potential;

a NOR gate for developing said column scan initiation signal, said NOR gate having first and second inputs and an output, said first and second inputs coupled to said first and second shift register outputs, respectively; and means for coupling said column scan initiation signal to said shift register data input.

18. The scanning circuitry in accordance with claim 1 wherein the means for sequentially detecting on each of said rows of fixedly mounted plates variable impedance coupled summation signals includes:

a plurality of transmission gates having their outputs electrically connected together to produce a common output;

means for coupling each of said rows of electricaly connected fixedly mounted plates in said switch matrix to an input of one of said plurality of transmission gates;

means for generating a plurality of row scan selection signals in time sequence, one such row scan selection signal for each of said plurality of transmission gates, to sequentially actuate said transmission gates;

means for coupling said row scan selection signals to said transmission gates;

means for integrating said impedance coupled summation signals; and means, responsive to said integrated impedance coupled summation signals, for producing a key-down signal indicating the detection of an operating pushbutton switch.

19. The scanning circuitry in accordance with claim 18 wherein the means for generating a plurality of row scan selection signals includes:

a shift register having a data input, a clock input, and a reset input, said shift register developing at least first, second, and third sequential output signals at first, second, and third outputs, respectively, upon receipt of a row scan initiation signal and column time interval control signals;

means, included in said column scanning signal producing means, for generating said column time interval control signals;

means for coupling said column time interval control signals to said shift register clock input;

means for maintaining said shift register reset input at a reference ground potential;

a NOR gate for developing said row scan initiation signal, said NOR gate having first, second, and third inputs and an output, said first, second, and third inputs coupled to said first, second, and third shift register outputs, respectively; and means for coupling said row scan initiation signal to said shift register data input.

20. The scanning circuitry in accordance with claim 18 wherein the means for integrating said impedance coupled summation signals includes:

first and second tandemly coupled integrator transmissin gates, said first integrator transmission gate having an input electrically connected to said row scan transmission gates common output;

a first capacitor having one terminal connected to a common connection point between said first and second tandemly coupled integrator transmission gates and another terminal connected to a reference ground potential;

a second capacitor having one terminal connected to an output of said second integrator transmission gate and another terminal connected to a reference ground potential, said second capacitor having a capacitance value which is approximately an order of magnitude greater than a capacitance value of said first capacitor;

timing means for controlling active transmission intervals of said first and second integrator transmission gates, said first gate having an active transmission interval during an inactive interval of said second gate and during which an electrical charge, proportional to one of said impedance coupled summation signals, is coupled to said first capacitor and said second gate having an active transmission interval commencing after said active transmission interval of said first gate during which said electrical charge on said first capacitor is coupled to said second capacitor; and means for maintaining said electrical charge coupled from said first capacitor to said second capacitor enabling said second capacitor to accumulate an electrical charge proportion to the predetermined number of electrical charges coupled to said first capacitor.

21. The scanning circuitry in accordance with claim 20 wherein the timing means for controlling active transmission intervals of said first and second integrator transmission gates includes:

a flip-flop having a data input, a clock input, and first and second complementary outputs;

first and second NOR gates, each having first and second inputs and an output;

means for coupling said master digital clock signals to said flip-flop clock input and to said first and second NOR gates first input;

means for coupling said flip-flop first complementary output to said first NOR gate second input and said flip-flop second complementary output to said second NOR gate second input and to said flip-flop data input; and means for coupling said first NOR gate output to said first integrator transmission gate and said second NOR gate output to said second integrator transmission gate.

22. The scanning circuitry in accordance with claim 20 wherein said means for maintaining said electrical charge coupled from said capacitor to said second capacitor includes:

a transmission gate having an input coupled to said output of said second integrator transmission gate and an output coupled to a reference ground potential; and means for actuating said transmission gate enabling said accumulated electrical charge on said second capacitor to be discharge to said reference ground potential.

23. The scanning circuitry in accordance with claim 18 wherein the means for producing a key-down signal includes:

means, included in said column scanning signal producing means, for generating a column time interval control signal; and a flip-flop having a data input, a clock input, and an output, said flip-flop producing a signal at its output in response to a signal coincidence of said column time interval control signal applied to said clock input and said integrated inpedance coupled summation signals applied to said data input.

24. The scanning circuitry in accordance with claim 18 wherein the means for correlating said variable impedance coupled summation signals and said column scanning signals to define an operated pushbutton switch includes:

a shift register latch circuit having a plurality of parallel jam inputs, a data input, a clock input, a reset input, and a preset enable input and a plurality of buffered outputs;

a flip-flop having a data input, a clock input, a set input, a reset input, and an output;

means for maintaining said latch data input, clock input, and reset input, and said flip-flop set input and reset input at a reference ground potential;

means for coupling said row scan selection signals and one of said column scanning signals to said plurality of latch parallel jam inputs and another of said column scanning signals to said flip-flop data input; and means for coupling said keydown signal to said latch preset enable input and to said flip-flop clock input to produce at said latch buffered outputs and said flip-flop output a row and column address defining said operated pushbutton switch.

25. In an arrangement for identifying an actuated switch in a matrix array of such switches wherein plural intersecting row and column circuits have a different one of said switches coupled between the intersecting row and column circuit at each matrix circuit intersection, the improvement comprising means for coupling first signals having a first phase through a predetermined impedance to all of said row circuits, said impedance being much smaller than a switchopen impedance of one of said switches and much larger than a switch-closed impedance of such switch, means for coupling second signals having a second phase opposite to said first phase to each of said column circuits in recurring sequence, the latter signals being of sufficient amplitude after coupling through a closed one of said switches to appear on the coupled row circuit with substantially greater amplitude than do the first signals, means for sampling row circuit signals in a recurrent sequence of said row circuits, means for detecting a phase difference between a row circuit signal sample and said first signals, such phase difference indicating an actuated one of said switches, and means responsive to said second signal coupling means, said sampling means, and said detecting means for producing a signal identifying said actuated switch.

* * * * *